Dec. 13, 1966     M. E. SPATT     3,291,201
AIR CONDITIONING APPARATUS FOR VEHICLES, ESPECIALLY FOR BUSES
Filed March 3, 1964     6 Sheets-Sheet 1

FIG. 1

INVENTOR.
MILTON E. SPATT
BY
J.B. Feeshuin
ATTORNEY.

FIG. 2

INVENTOR.
MILTON E. SPATT
BY
J.B. Felshin
ATTORNEY

Dec. 13, 1966 M. E. SPATT 3,291,201
AIR CONDITIONING APPARATUS FOR VEHICLES, ESPECIALLY FOR BUSES
Filed March 3, 1964 6 Sheets-Sheet 3

INVENTOR.
MILTON E. SPATT
BY
J.B. Felshin
ATTORNEY.

Dec. 13, 1966  M. E. SPATT  3,291,201
AIR CONDITIONING APPARATUS FOR VEHICLES, ESPECIALLY FOR BUSES
Filed March 3, 1964  6 Sheets-Sheet 4

FIG. 5

INVENTOR.
MILTON E. SPATT
BY
J.B. Felshin
ATTORNEY.

Dec. 13, 1966     M. E. SPATT     3,291,201
AIR CONDITIONING APPARATUS FOR VEHICLES, ESPECIALLY FOR BUSES
Filed March 3, 1964     6 Sheets-Sheet 6

INVENTOR.
MILTON E. SPATT

BY *J. B. Felshin*

ATTORNEY.

United States Patent Office 3,291,201
Patented Dec. 13, 1966

3,291,201
AIR CONDITIONING APPARATUS FOR VEHICLES, ESPECIALLY FOR BUSES
Milton E. Spatt, % Wayne Cooling Equip. Corp., 25 Jay St., Brooklyn, N.Y.
Filed Mar. 3, 1964, Ser. No. 349,080
26 Claims. (Cl. 165—42)

This invention relates to air conditioning apparatus for vehicles, especially buses.

This application is a continuation in part of my co-pending application Serial No. 340,861 filed January 29, 1964 for Air Conditioning Apparatus for Vehicles, Especially for Buses.

An object of the present invention is to provide an improved arrangement of air distribution ducts for air conditioning systems, especially suitable for installation in buses which are not originally built with such systems.

Another object is to provide an extremely compact evaporator-heater section, including evaporator cooling coils, reheat coils and motor and blowers, for mounting under the roof of the bus, inside the bus and at its extreme rear over the rear window of the bus.

A further object is to provide an improved air conditioning evaporator-heater unit which is especially adaptable for use also in the winter months to provide heat for buses which do not have separate heating systems.

Yet a further object of this invention is to provide in an air conditioning system of the character described, duct construction so designed and placed at the underside of the roof of the bus as to allow sufficient headroom to permit passengers to leave the bus by its rear exit door without bumping their heads, and also to allow passengers holding the hand rails to comfortably stand in the aisle and clear the ducts without interference or likelihood of striking the passengers' heads.

Another object is generally to provide an improved compact, inexpensive and highly efficient arrangement of air distribution ducts in conjunction with an air conditioning evaporator-heater section for buses.

A still further object is generally to provide improved air conditioning equipment for vehicles, especially buses.

The above and other objects, features and advantages of the invention will be more fully understood from the following description of a presently preferred embodiment of the invention in which:

Figure 7:
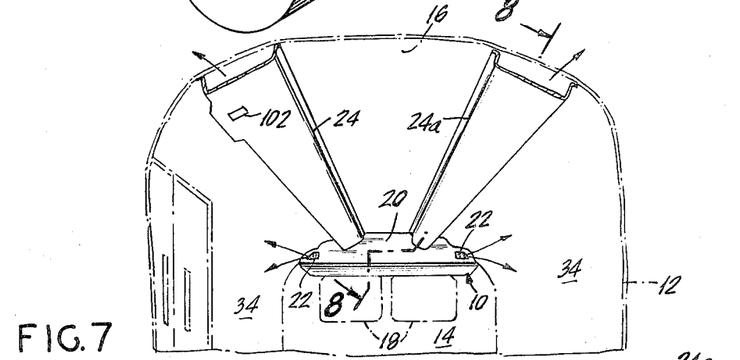
FIG. 7 is a perspective view looking toward the rear of the interior of a bus showing the evaporator-heater section and associated ductwork of the present invention.
Figure 8:
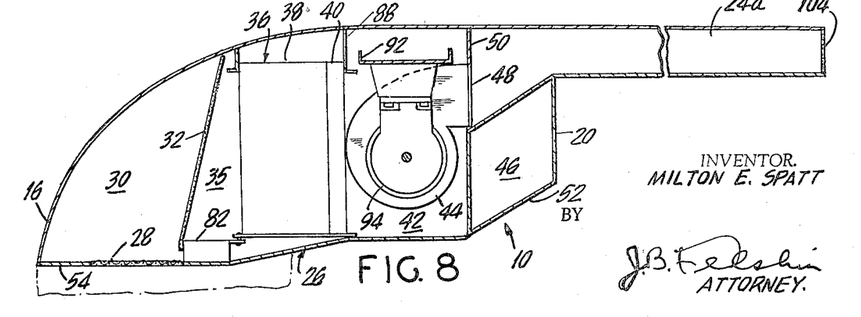
FIG. 8 is a longitudinal diagrammatic sectional view, taken on line 8—8 of FIG. 7.

Referring now to the drawings in detail and first to FIGS. 7 and 8, the evaporator-heater section 10 of the air-conditioning system of bus 12 is mounted in the inside of the bus, against its rear wall 14 and against the rear portion of its top wall 16, above rear windows 18. The front vertical wall 20 of the evaporator-heater section is provided with a pair of laterally spaced openings covered by grills 22 through which flow cooled or heated air for the rear of the bus. A pair of laterally spaced ducts 24 and 24a extend longitudinally and forwardly from wall 20 for delivering air (cooled or heated) to the front part of the bus.

Figure 1:
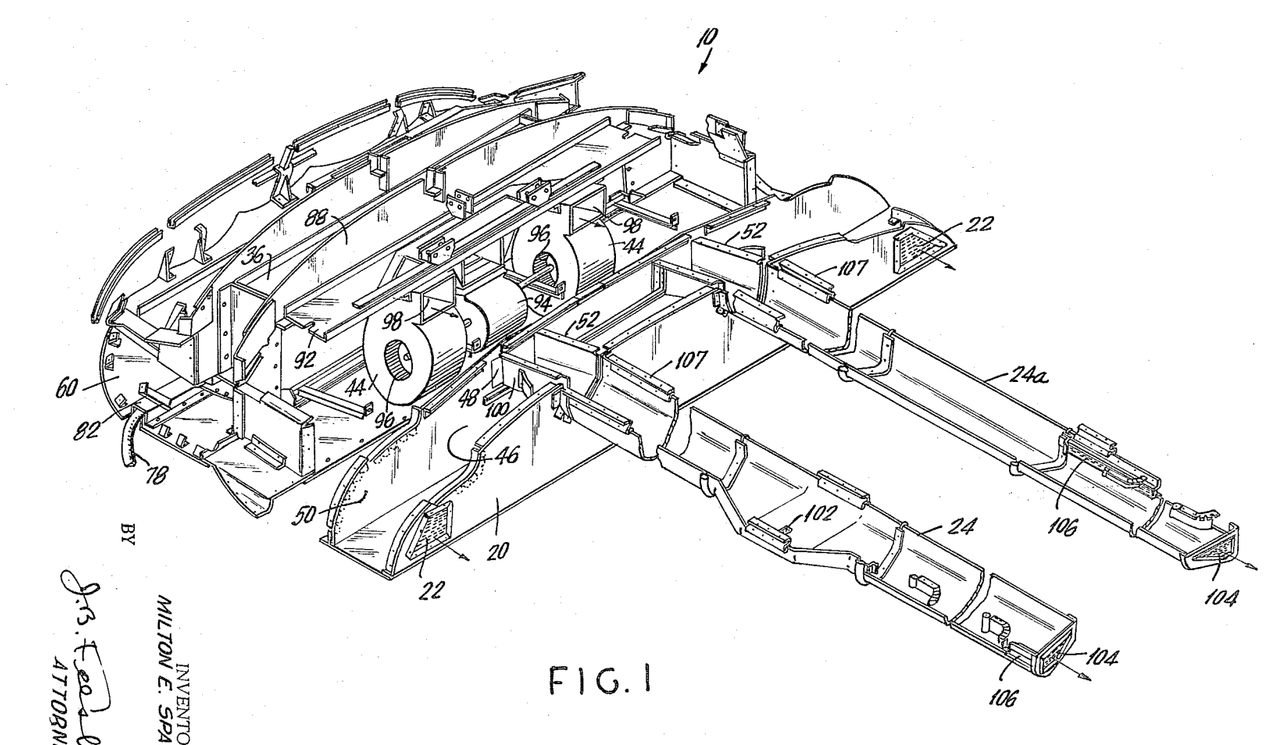
FIG. 1 is a downward and rearward perspective-exploded view of an air conditioning evaporator-heater section and associated air distribution ducts, associated structural supports and ancillary parts, in accordance with the invention.
Figure 2:
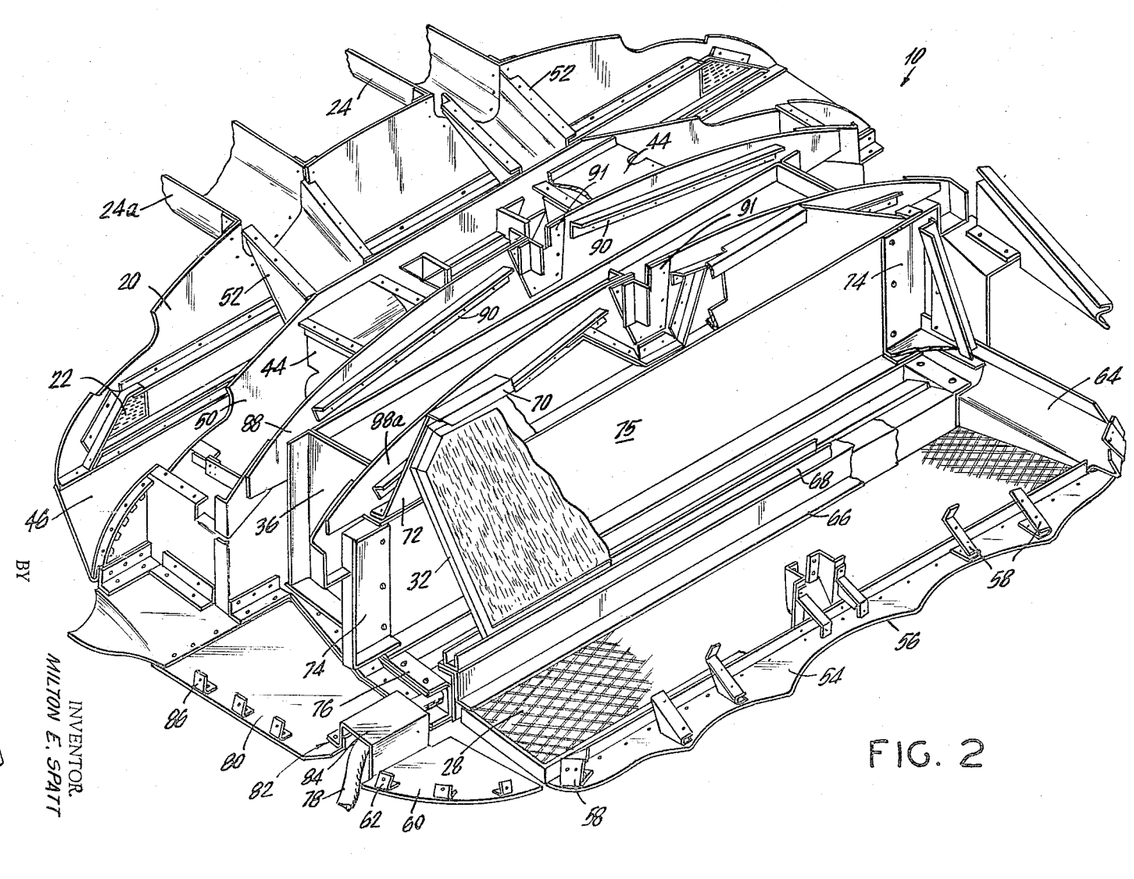
FIG. 2 is a downward and forward partial perspective view of the evaporator-heater section of FIG. 1.

As best seen in FIGS. 1, 2, and 8, the evaporator-heater section 10 comprises a bottom wall 26 which has a rear opening or air inlet covered by a grill 28 through which air flows upwardly from the interior of the bus to be cooled or heated. The air flows into a rear air chamber 30 and through an air filter 32 and it will be understood that chamber 30 and filter 32 extend transversely between the side walls 34 of the bus, from one side wall to the other. It is also to be understood that the top wall of the evaporator-heater section is formed by the top wall 16 of the bus and the side walls of section 10 are formed by the side walls 34 of the bus. Filter 32 is inclined upwardly and forwardly.

From filter 32, the air passes into the cooling or heating chamber 35 in which is mounted a combined air conditioning evaporator-heater device 36 that comprises an evaporator-cooler section 38 and an air conditioning reheat or heating section 40. It is to be understood that device 36 is part of the air conditioning system of the bus. The complete air conditioning system is fully illustrated and described in my copending U.S. patent application Serial No. 302,031 filed August 14, 1963 and need not again be described here. As is well understood, the evaporator-heater section functions to cool air flowing over it while the reheat section heats air flowing over it, as necessary, and as determined by the controls of the system. The specific operation of device 36 will be more fully described hereinafter.

The cooled or heated air flows into the blower chamber 42 in which are mounted a pair of coaxial blowers 44 that induce flow of air from the interior of the bus through grill 28 and through the other compartments of the evaporator-heater section 10, in succession, and therefrom into the blowers. From the blowers, the air passes simultaneously into a plenum chamber 46 (FIGS. 1, 2 and 8) and into ducts 24 and 24a through openings 48 in the front vertical wall 50 forming the front of chamber 42. The ducts are interconnected to openings 48 by interconnecting transition ducts 52.

Referring now more specifically to FIGS. 1 and 2, the details of construction of evaporator-heater section 10 and its associated ducts and ancillary parts may be more easily understood. Bottom wall 26 of section 10 has a rear part 54 whose rear edge 56 abuts against the rear wall 14 of the bus. Brackets 58 are secured to part 54 and are secured to adjacent parts of the rear and side walls of the bus. Grill 28 is suitably secured forwardly of part 54 and extends transversely of the bus for substantially its full width. A bottom side panel 60 is positioned at one end of the grill and carries support angles 62 for securing to the adjacent side wall of the bus. At the opposite end of the grill is positioned a grill shelf bracket 64. A grill holding bracket 66 is positioned along the forward edge of the grill and a channel 68 for filter 32 is secured to the top of bracket 66. The lower edge of inclined filter 32 rests in the channel. The upper edge of the filter extends under flange 70 of a filter holding bracket 72 that is secured to the top of laterally spaced vertical panel members 74 which define an opening 75. Positioned below filter 32 is a drip pan 76 which catches condensate from the cooled air. The conduit is led away through a drain hose 78. A bottom side panel member 80 is connected to bottom panel 60 by a channel 82 whose web 84 extends above hose 78. It will be understood that a hose 78 is provided at each end of the drain pan. Support angles 86 for connecting to the side walls of the bus are secured to bottom panel member 80.

Figure 6:
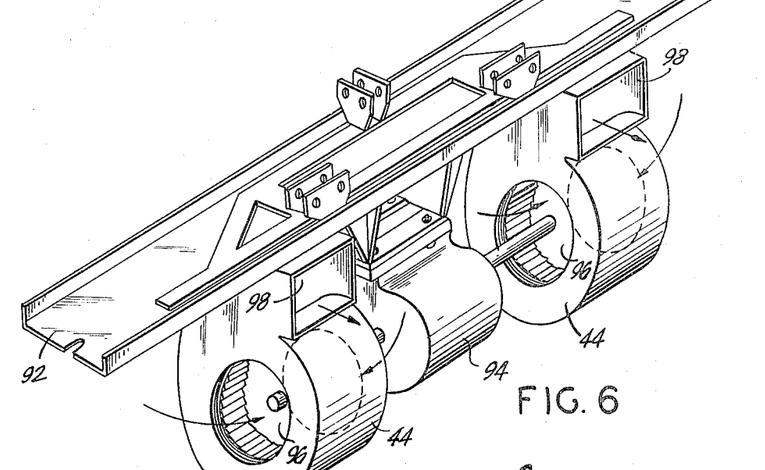
FIG. 6 is a perspective view of the blower section of the evaporator-heater unit and its associated top support.

Spaced forwardly of panel members 74 is a transversely extending vertical front coil hanger bar 88 on which are mounted reinforcing angles 90. A vertical rear coil hanger bar 88a extends transversely between panel members 74 and is also provided with companion reinforcing angles 90. Supporting pads 91 are secured to the hanger bars for attachment to ceiling supports for section 10. Between hanger bars 88 and 88a the evaporator-heater unit 36 is suitably mounted. Spaced forwardly of front hanger bar 88 is transverse vertical wall 50 which, as best seen in FIG. 1, is provided with the previously mentioned openings 48. A transverse channel member 92 (FIGS. 1, 6 and 8) is positioned at the top of wall 50 and panel 88 and supports rotary blowers 44 in chamber 42. It is to be noted that two spaced blowers are provided between which is suitably supported an electric motor 94 whose drive shaft is connected to the axially aligned drive shafts of the blowers. The opposite sides of each of the blowers are open at 96 and in communication with chamber 42 from which air is drawn into the blowers and therefrom through their respective outlets 98. It is to be understood, as more fully explained in my above referred to application, that current may be supplied to motor 94 from a separate generator associated with the air conditioning sytem of the bus and driven by an engine separate from the drive engine of the vehicle, or it may be supplied from the bus battery.

In accordance with a feature of the invention, wherein the bus is not provided with a separate heating system of its own, electric motor 94 may be operated at a slower speed off the vehicle's battery when the air conditioning system is not working to utilize the reheat section 40 of evaporator-heater until 36 as a heating device to blow air slowly over the reheat section for warming the bus. In other words the evaporator-heating section of the air conditioning system may be partially operated for heating the bus in those situations where the bus does not have a separate heating system, as in buses usually found in the southern and southwestern parts of the U.S. The slower operating motor, due to the blower voltage provided by the vehicle's battery (12 volts), as compared to the voltage (32 volts) of the generator of the air conditioning system, gives the air more time in which to pass over the reheat section of unit 36 and thereby permit heating of the air to a greater degree.

It is to be noted, as best seen in FIGS. 1 and 8 that outlets 98 of the blowers are against the companion openings 48 so that air is blown into plenum chamber 62. The inlet ends of transition ducts 52 are against wall 50 with one side 100 inwardly of one end of the opening 48 while the opposite side of the transition duct is in alignment with the other end of the opening, thereby dividing each of the openings into two parts, of which one is in communication with the transition duct and the other is in communication with plenum chamber 46. In this manner air is simultaneously delivered to ducts 24 and 24a and the plenum chamber.

The front vertical wall 20 of the evaporator-heater section 10 forms the front wall of the plenum chamber so that air is delivered therefrom through grills 22. Air is simultaneously transmitted through the transition ducts into ducts 24 and 24a and therefrom into the forward part of the bus. For this purpose duct 24 is provided with a grill 102 (FIG. 1) in its bottom wall adjacent the door opening of the bus. The air blows out downwardly from the duct and is not directed toward the door opening of the bus. The end of the duct is provided with an outlet end grill 104 as is duct 24a. Also ducts 24 and 24a are each provided with a longitudinal outlet grill 106 in their respective side walls, forwardly of the door opening. Grills 104 and 106 permit air to flow into that part of the interior of the vehicle, forwardly of the vehicle's door opening. Supports 107 are provided to secure the ducts to the top wall of the vehicle.

Figure 3:
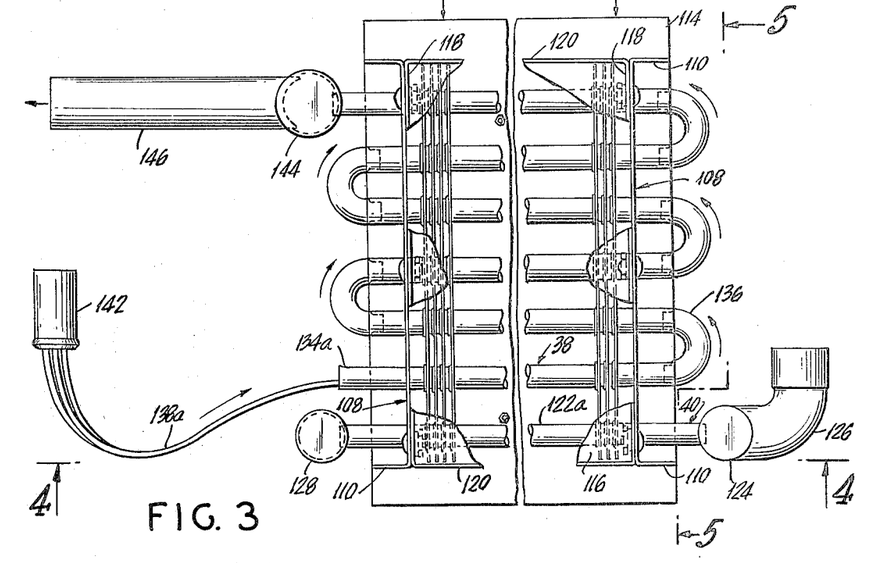
FIG. 3 is top plan view of the evaporator-heater unit of the evaporator-heater section of the present invention.
Figure 4:
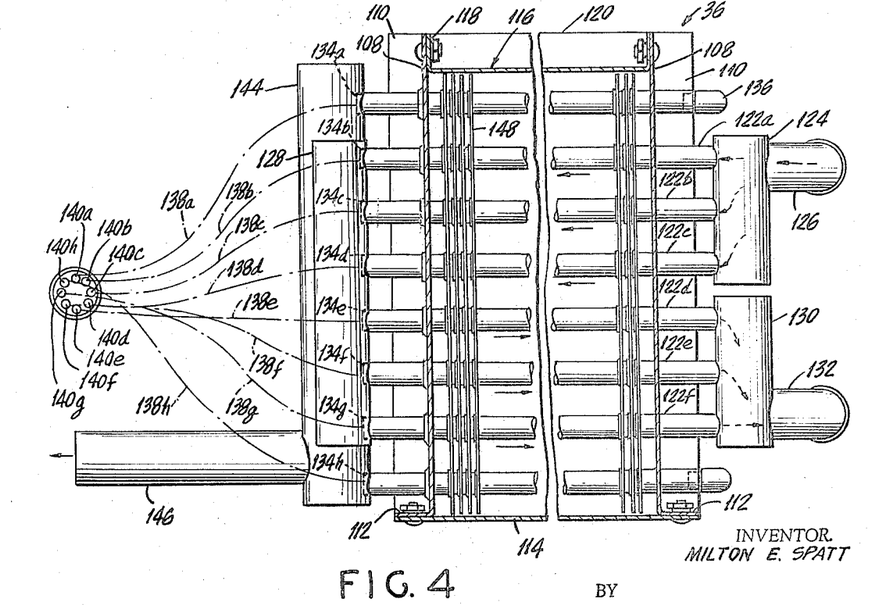
FIG. 4 is a vertical cross section taken on line 4—4 of FIG. 3.
Figure 5:
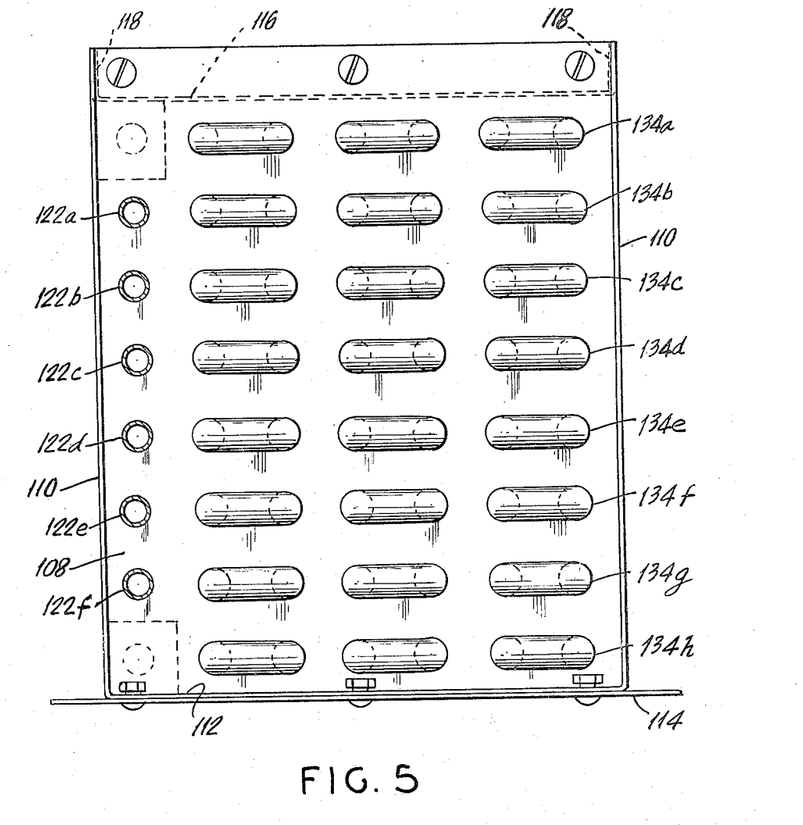
FIG. 5 is a sectional view taken on line 5—5 of FIG. 3.

The evaporator-heater unit 36 will now be described in detail with repsect to FIGS. 3 to 5. The unit comprises a pair of longitudinally spaced generally rectangular tube supporting sheets 108, each having spaced side flanges 110 which extend outwardly away from each other. The bottom of each tube sheet is provided with an outwardly extending bottom flange 112 (FIG. 4). The bottom flanges are interconnected by a flat bottom cover plate 114, and a top cover plate 116 is provided having longitudinally spaced upwardly extending flanges 118 which are connected to the upper marginal edge portions of the tube sheets. The top cover plate is also provided with upwardly extending end flanges 120 which extend between flanges 118.

As best seen in FIG. 8, there are seven vertical rows of piping, one behind the other. The first row of piping constitutes the reheat section 40 of the evaporator-heater unit and it will be understood, as indicated by the arrows, that the air flows horizontally through the device by first passing through the evaporator section and then over the reheat pipes which constitute the evaporator-cooling section 38 of the device. Fresh air may or may not be brought in from the outside and merged with air within the vehicle body.

The reheat section comprises a single vertical row of horizontal pipes 122a, 122b, 122c, 122d, 122e and 122f. The inlet ends of pipes 122a, 122b and 122c are connected to an inlet manifold pipe 124 whose inlet pipe section 126 is connected by suitable hosing to the outlet of the water jacket of the drive engine for the vehicle. The outlet ends of pipes 122a, 122b and 122c are connected to a manifold pipe 128 and the inlet ends of pipes 122d, 122e and 122f are connected to pipe 128. The outlet ends of pipes 122d, 122e and 122f are connected to an outlet pipe 130 whose outlet pipe section 132 is connected to the inlet of the water jacket of the vehicle's drive engine. The reheat pipes pass through suitable holes provided in the tube sheets and are supported by said sheets. Hot water from the engine's water jacket is circulated through the reheater pipes to warm the air, as necessary, during operation of the air conditioning system. During winter conditions when the air conditioning system is shut down, as previously described, the reheater section may be used as a heater for the vehicle.

The evaporator-cooling section 38 comprises a series of vertical spaced serpentine shaped horizontal pipes 134a, 134b, 134c, 134d, 134e, 134f and 134g which extend horizontally from the front of the unit, behind the reheat section, toward the rear of the unit. The pipes cross back and forth between the tube sheets, passing through openings in the latter, and adjacent ends of the straight portions of the pipes are interconnected by U-shaped pipe connectors 136. The inlet ends of each of the evaporator pipes are connected by suitable tubing 138a, 138b, 138c, 138d, 138e, 138f, 138g and 138h, resepectively, to the companion outlet nozzles 140a, 140b, 140c, 140d, 140e, 140f, 140g and 140h, respectively, of a refrigerant receiver 142 of the air conditioning system. The outlet end of each pipe is connected to a refrigerant outlet manifold pipe 144 which has a lower outlet pipe section 146 that is connected to the compressor of the air conditioning system. The pipes of the evaporator section and the reheat section are provided with suitable fins 148.

While I have shown and described a preferred embodiment of the invention, it will be understood that the invention may be embodied otherwise than as herein specifically shown or described, and certain changes in the form and arrangement of parts may be made according to the principles or ideas of the invention and within the scope of the appended claims.

In accordance with this invention duct work is supplied for buses that have no ducts. The purpose of this invention is to provide an evaporator and distribution system for buses not already equipped with built in duct work.

The duct work herein achieves an efficient distribution of air and yet does not require installation of anything that would violate existing rules of various regulatory bodies governing head room. We leave space over center aisle clear. Grab rails are accessible since they are between duct and side walls.

Figure 9:
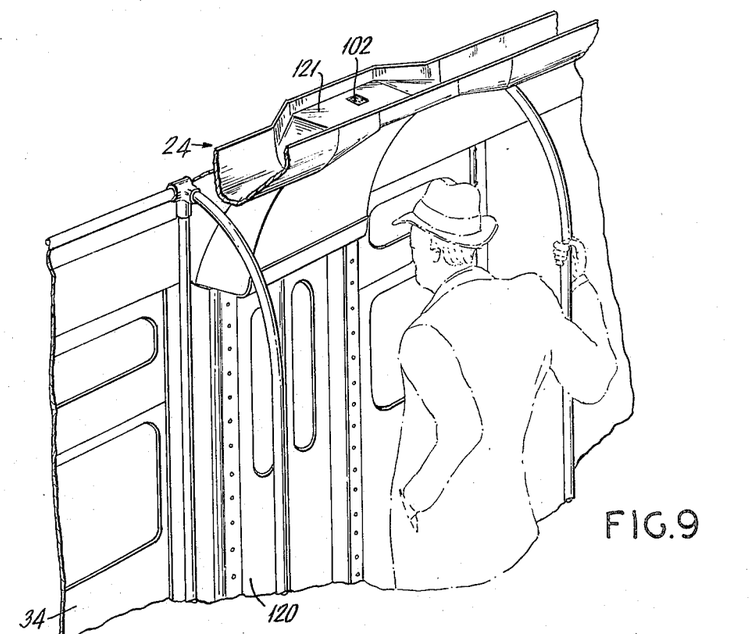
FIG. 9 is a perspective view showing the rear exit door at one side of the bus, and one of the air distributor ducts and illustrating the clearance for the head of a passenger leaving the bus by said rear door.
Figure 10:
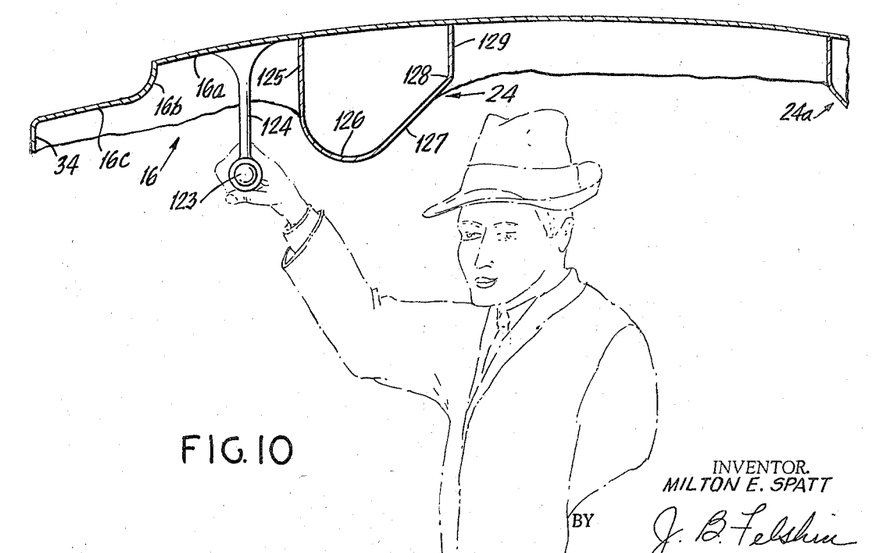
FIG. 10 is transverse cross-sectional view of the top of the bus and showing the position of a hand rail and one of the air distributor ducts and illustrating the position of a passenger standing in the aisle and holding the hand rail.

Referring now to FIGS. 9 and 10, there is shown therein the roof or top wall 16 of the bus. Said top wall 16 has an upwardly recessed central longitudinal portion 16a located over the center aisle of the bus. Extending down from said upwardly recessed portion, are inner side roof portions 16b from which extend outwardly and downwardly, sloped portions 16c which extend to the side walls 34 of the bus. It will be noted that walls 20, 50 and other portions of the evaporator reheater section 10 fit against the undersides of said portions 16a, 16b, 16c of the bus top wall 16.

The right side wall 34 of the bus is provided with a rear exit door 120, and the usual steps are provided leading to a usual platform at the lower end of the door. The duct 24, as shown in the drawing opposite door 120, has a flat bottom wall 121 which is formed with the distributor outlet grill 102. This wall 121 is recessed upwardly and is higher than the bottom of the duct 24, and hence provides additional clearance or head room for passengers leaving the bus at the exit door 120. It will be noted that the duct is wider at the upwardly flattened portion 120 to maintain relatively uniform cross-sectional area of the duct. The outer side of the duct is extended outwardly toward the door 120, so as to maintain clearance over the center aisle. Only the duct on the exit door side of the bus, is so flattened. It will be observed that the flat wall 121 is closer to the top wall 16a than the rest of the bottom of the duct, to provide the desired clearance, only where it is necessary, opposite the door 120.

The bus is provided with usual handrails 123 for passengers standing in the aisle. These handrails are supported by hangers or brackets 124 attached to roof portion 16a adjacent roof portions 16b. The ducts 24, 24a are attached to the roof top portion 16a and hence are located in the upwardly recessed portion of the top wall of the bus. The handrails and their hangers are located between ducts 24, 24a and walls 16b.

Each duct 24, 24a has an outer vertical wall 125 from the lower end of which extends an inwardly and upwardly curved wall 126. Extending from curved wall 126 is an upwardly and inwardly inclined bottom wall 127 merging into an upwardly curved wall 128, from which extends upwardly an inner vertical wall 129 shorter than wall 125.

The ducts 24, 24a are located in spaced relation to the handrails, but only some inches spaced therefrom, so that a passenger standing in the aisle and holding onto the handrail will have his holding arm beneath the duct, and the duct will be located between his hand and his head, thus allowing comfort for the passenger. It is the outer walls 125 of the ducts that are provided with the outlet grills 106 as shown in the drawing. The incline of bottom walls 127 aid in providing the clearance. The space between the handrails and the ducts provide space or clearance for the hands of passengers standing in the aisle and grasping the handrail.

I claim:

1. In combination, a vehicle having a top wall, a rear wall, and spaced side walls, an air conditioning evaporator section mounted against said top wall and rear wall and between said side walls, said evaporator section including means forming a chamber having an inlet and an outlet, an evaporator of an air conditioning system positioned in said chamber, means for passing air from said vehicle into said evaporator chamber, said air passing means comprising means forming an air chamber positioned at said inlet of said evaporator chamber, said air chamber forming means including a bottom wall having an opening therein in communication with the interior of said vehicle and having an outlet in communication with the inlet of said evaporator chamber, a filter positioned at said outlet of said air chamber, means forming another chamber at said outlet of said evaporator chamber and in communication with the latter, blower means positioned in said other chamber for inducing air flow into and from said evaporator chamber and having outlet means, and means in communication with said outlet means and in communication with the interior of said vehicle for distributing air to the interior of said vehicle, said air distribution means comprising means forming a plenum chamber having a first wall having an opening in communication with said outlet means of said blower means, a second wall spaced from said first wall and having an opening in communication with the interior of said vehicle and having another opening, an air distribution duct extending through said other opening in said second wall and having an outlet opening in communication with the interior of said vehicle, and said duct extending between said first and second walls and having one end in communication with said opening in said first wall.

2. The combination of claim 1, said air distribution means comprising means forming a plenum chamber having a first wall having an opening in communication with said outlet means of said blower means, a second wall spaced from said first wall and having an opening in communication with the interior of said vehicle and having another opening, an air distribution duct extending through said other opening in said second wall and having an outlet opening in communication with the interior of said vehicle, and said duct extending between said first and second walls and having one end in communication with said opening in said first wall.

3. The combination of claim 1, and air heater means positioned in said evaporator chamber adjacent said evaporator.

4. The combination of claim 1, said evaporator comprising a pair of tube supporting sheets spaced between said side walls of said vehicle, a series of vertically spaced refrigerant-carrying pipes positioned on said tube supporting sheets and extending therebetween, each of said pipes having horizontally spaced parts interconnected to each other and extending between said tube supporting sheets.

5. The combination of claim 3, said air heater means comprising hot water carrying pipe means having vertically spaced pipe parts in communication with each other.

6. The combination of claim 4, and air heater means positioned in said evaporator chamber adjacent said evaporator, said air heater means comprising a series of vertically spaced pipes positioned on said tube supporting sheets, in communication with each other, and extending between said tube sheets.

7. In a bus comprising a bus body having a center aisle, a top wall, side walls and a rear wall, means providing a transverse first chamber at and beneath the rear of the top wall and at the rear wall and having means to allow air from the interior of the bus body to enter said first chamber, means providing a second transverse chamber in front of the first chamber and at and beneath the top wall of the bus body, in communication with the first chamber to receive air therefrom, evaporator and reheater means of a refrigerating system within said second chamber, a third transverse chamber in front of the second chamber and communicating therewith to receive air therefrom, and located at the underside of said top wall, air blowers in said third chamber, a motor in said third chamber to operate said blowers, said blowers having inlets and outlets, a transverse plenum chamber in front of said third chamber, and at and beneath said top wall, a pair of spaced longitudinal ducts on opposite sides of the center aisle of the bus body and extending from said plenum chamber forwardly thereof and located against the underside of said top wall, means to connect the outlets of the blowers with the interior of the plenum chamber and also with said ducts, said plenum chamber having outlet means, and said ducts having outlet means.

8. The combination of claim 7, said means connecting the outlets of said blowers with said plenum chamber and ducts including conduit means passing through the plenum chamber and connecting said outlets of said blowers with said ducts.

9. The combination of claim 7, said means to allow air from the interior of the bus body to enter said first chamber comprising an apertured bottom wall for said first chamber.

10. The combination of claim 7, and an air filter being located between the first and second chambers.

11. The combination of claim 7, said second chamber comprising a top wall, a bottom wall and end walls, said reheater comprising a plurality of horizontal, vertically spaced water pipes supported by and passing through said end walls and located in a vertical plane, an inlet manifold connecting adjacent ends of half the number of said water pipes outside of one end wall, an outlet manifold interconnecting the adjacent ends of the remaining half of said water pipes, at the outer side of said end wall, and a manifold connecting the opposite ends of all of said water pipes at the outer side of the other end wall.

12. The combination of claim 11, said evaporator comprising a plurality of horizontal rows of horizontal pipes, with a plurality of parallel pipes in each row, supported by and passing through said end walls of said second chamber, means to connect the pipes of each row in communication with each other to provide a plurality of continuous pipes arranged one above the other, means to feed liquid refrigerant to the inlet ends of said continuous pipes, a manifold connecting the outlet ends of said continuous pipes to lead refrigerant from said pipes.

13. In an evaporator-reheater section for a vehicle, adapted to be mounted against the underside of the top of the vehicle to extend from the rear of the vehicle forwardly thereof, an evaporator for a refrigerating system, a reheater for said evaporator, blower means disposed forwardly of said evaporator and reheater, to cause air to flow past said evaporator and heater, electric motor means to actuate said blower means, said blower means comprising a pair of blower casings each having an inlet and an outlet, a pair of spaced longitudinal ducts having one end communicating with one of said outlets, and extending each forwardly, a plenum chamber in front of said blower means, and also communicating with said outlets, and said plenum chamber being formed with outlet means, and said ducts being provided with outlet means extending longitudinally of said ducts.

14. The combination of claim 13, said ducts passing through said plenum chamber.

15. An evaporator-reheater section adapted to be mounted against the underside of the top of the body of a vehicle, at the rear thereof, and to extend forwardly from said rear, said section comprising means forming first, second and third transversely extending chambers, means to provide communication of the chambers with each other, said first chamber having means for the flow of air from the interior of the body of the vehicle into said first chamber, an evaporator-reheater device of an air conditioning system positioned in said second chamber for receiving air from said first chamber to vary the temperature of said air, a pair of blowers positioned in said third chamber and having inlets for receiving air from said evaporator-reheater device and having outlets, a motor for operating said blowers, a pair of spaced longitudinal ducts each having an inner end in communication with one of said outlets, and extending forwardly therefrom, and means to attach said evaporator-reheater section to said body of said vehicle, said ducts each having inner and outer longitudinal side walls interconnected by a bottom wall, each of the outer side walls having a longitudinally extending outlet opening, each of said ducts having an outlet opening at its outer end, and one duct having an upwardly recessed bottom wall to provide head clearance for passengers.

16. An evaporator-reheater section as defined in claim 15, said ducts each having inner and outer longitudinal side walls interconnected by a bottom wall, each of the outer side walls having a longitudinally extending outlet opening.

17. An evaporator-reheater section as defined in claim 16, each of said ducts having an outlet opening at its outer end.

18. The combination of claim 17, one side wall of said body being provided with a rear exit door, and the duct adjacent said door having an upwardly recessed bottom wall to provide head clearance for passengers leaving the vehicle by means of said exit door.

19. An evaporator-reheater section adapted to be mounted against the underside of the top of the body of a vehicle, at the rear thereof, and to extend forwardly from said rear, said section comprising means forming first, second and third transversely extending chambers, means to provide communication of the chambers with each other, said first chamber having means for allowing the flow of air from the interior of the body of the vehicle into said first chamber, an evaporator-reheater device of an air conditioning system positioned in said second chamber for receiving air from said first chamber to vary the temperature of said air, a pair of blowers positioned in said third chamber and having inlets for receiving air from said evaporator-reheater device and having outlets, a motor for operating said blowers, a pair of spaced longitudinal ducts each having an inner end in communication with one of said outlets, and extending forwardly therefrom, and means to attach said evaporator-reheater section to said body of said vehicle, said ducts each having inner and outer longitudinal side walls interconnected by a bottom wall, each of the outer side walls having a longitudinally extending outlet opening, each of said ducts having an outlet opening at its outer end, longitudinal handrails attached to the top wall of the vehicle at opposite sides of the aisle, and said ducts being located inside of said handrails and spaced therefrom so as to be located between the handrails and heads of passengers standing in the aisle and holding said handrails, said spacing providing clearance for the passengers' hands grasping the handrail.

20. In combination, a bus body having a top wall, side walls, a rear wall, a center aisle, and longitudinal handrails attached to said top wall at opposite sides of said aisle, an evaporator-reheater unit of an air conditioning system for the bus, attached to the top wall adjacent the rear wall, and having air blower means to cause air to flow through said unit, and a pair of longitudinal distributor ducts communicating with said blower means and located at the underside of the top wall of the bus and at opposite sides of the aisle and spaced inwardly of said handrails in closely spaced relation thereto.

21. The combination of claim 20 one of said side walls being provided with a rear exit door, the duct closer to the side wall which has the exit door, having an upwardly recessed bottom wall to provide head clearance for passengers leaving the bus by said exit door.

22. The combination of claim 21, said ducts having outer walls, upwardly and inwardly inclined bottom walls and inner walls.

23. The combination of claim 22, said outer walls being formed with longitudinal outlet distributor openings.

24. In combination, a bus body having a top wall, side walls and a rear end wall, a center aisle, said top wall having a central upwardly recessed longitudinal portion above said center aisle of the bus, and with downwardly extending portions at opposite sides of the upwardly extending recess, from the lower ends of which, portions of the top wall below the top of the recessed portion, extend outwardly to the side walls of the body, a pair of longitudinal handrails attached to the upwardly recessed central portion of the top wall and located at opposite sides of the center aisle, an evaporator-reheater unit of an air conditioning system mounted against said portions of said top wall of the body adjacent said rear wall and having blower outlets, a pair of spaced longitudinal distributor ducts against the underside of said upwardly recessed portion, located inside of, and somewhat spaced from said handrails and adjacent opposite sides of said aisle and communicating with said outlets.

25. The combination of claim 24, one of said side walls being provided with a rear exit door, and the duct adjacent said one side wall, being recessed upwardly at its underside, opposite said door, to provide head clearance for passengers leaving the vehicle through said exit door.

26. The combination of claim 24, said ducts each having an upwardly and inwardly inclined bottom wall, and outer and inner walls joined to said bottom wall by curved walls, and said outer wall of each duct being provided with a longitudinal outlet distributor opening.

References Cited by the Examiner
UNITED STATES PATENTS

| | | | |
|---|---|---|---|
| 1,999,720 | 4/1935 | Davis | 165—42 |
| 2,188,975 | 2/1940 | Herz | 165—140 |
| 2,311,622 | 2/1943 | Alexander et al. | 165—43 |

ROBERT A. O'LEARY, *Primary Examiner.*

CHARLES SUKALO, *Examiner.*